(12) United States Patent
Blair et al.

(10) Patent No.: US 10,011,767 B2
(45) Date of Patent: Jul. 3, 2018

(54) GREEN PRODUCTION OF HIGHLY FLUORESCENT CARBON QUANTUM DOTS FROM CARBON DIOXIDE

(71) Applicants: Richard Blair, Oviedo, FL (US); Deepti A. Siddhanti, Rockledge, FL (US); David J. Nash, Orlando, FL (US)

(72) Inventors: Richard Blair, Oviedo, FL (US); Deepti A. Siddhanti, Rockledge, FL (US); David J. Nash, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 15/196,141

(22) Filed: Jun. 29, 2016

(65) Prior Publication Data

US 2016/0376502 A1 Dec. 29, 2016

Related U.S. Application Data

(60) Provisional application No. 62/186,008, filed on Jun. 29, 2015.

(51) Int. Cl.
| | |
|---|---|
| *C01B 32/00* | (2017.01) |
| *C09K 11/65* | (2006.01) |
| *C01B 32/15* | (2017.01) |
| *B82Y 20/00* | (2011.01) |
| *B82Y 40/00* | (2011.01) |

(52) U.S. Cl.
CPC .............. *C09K 11/65* (2013.01); *C01B 32/15* (2017.08); *B82Y 20/00* (2013.01); *B82Y 40/00* (2013.01); *C01P 2006/60* (2013.01); *Y10S 977/774* (2013.01); *Y10S 977/896* (2013.01); *Y10S 977/95* (2013.01)

(58) Field of Classification Search
CPC . C09K 11/65; C01B 31/0206; C01P 2006/60; Y10S 977/95; Y10S 977/774; Y10S 977/896; B82Y 40/00; B82Y 20/00
See application file for complete search history.

(56) References Cited

PUBLICATIONS

Liu, Ruihua, et al. "Metal nanoparticle/carbon quantum dot composite as a photocatalyst for high-efficiency cyclohexane oxidation." ACS Catalysis 4.1 (2013): 328-336.*
Li, Fan, et al. "Mg/N double doping strategy to fabricate extremely high luminescent carbon dots for bioimaging." RSC Advances 4.7 (2014): 3201-3205.*
Sun, Y.P. et al. "Quantum-Sized Carbon Dots for Bright and Colorful Photoluminescence", Journal of the American Chemical Society, 2006, vol. 128, pp. 7756-7757.
Lim, S.Y., et al., "Carbon quantum dots and their applications", Chemical Society Reviews, 2014.
(Continued)

*Primary Examiner* — Richard M Rump
(74) *Attorney, Agent, or Firm* — Timothy H. Van Dyke; Beusse, Wolter, Sanks & Maire PLLC

(57) ABSTRACT

A method of preparing fluorescent material containing carbon quantum dots, comprising milling a metal in the presence of carbon dioxide in a sealed container for a set duration to form the carbon quantum dots containing material. The carbon dioxide is preferably obtained as a waste gas from a human related activity such as an industrial process and may be provided in the form of dry ice.

11 Claims, 7 Drawing Sheets

(56) References Cited

PUBLICATIONS

Chakrabarti, A. et al., "Conversion of carbon dioxide to few-layer graphene", J. Mater Chem, 2011, vol. 21, pp. 9491-9493.

Luo, P.G. et al., "Carbon-based quantum dots for fluorescence imaging of cells and tissues", RSC Advances, 2014, vol. 4, pp. 10791-10807.

Chan, W. et al., "Luminescent quantum dots for multiplexed biological detection and imaging", Current Opinion in Biotechnology, 2002,. vol. 13, pp. 40-46.

Costa-Fernandez, J. et al., "The use of luminescent quantum dots for optical sensing", Trends in Analytical, Chemistry, 2006, vol. 25 (3), pp. 207-218.

Dukes III, A., et al., "Luminescent Quantum Dots", ECS Transactions, 2000 vol. 33, pp. 3-16.

Smith, A. et al., "Engineering Luminescent Quantum Dots for in Vivo Molecular and Cellular Imaging", Annals of Biomedical Engineering, 2006, vol. 34, pp. 3-14.

Cao, L. et al., "Carbon dots for multiphoton biomaging", Journal of the American Chemical Society, 2007, vol. 129 (37), pp. 11318-11319.

Ray, S et al., "Fluorescent carbon nanoparticles; synthesis, characterization and bioimaging application", The Journal of Physical Chemistry, 2009, vol. 113 (43), pp. 18546-18551.

Luo, P. G. et al., "Carbon quantum dots for optical bioimaging", Journal of Materials Chemistry 2013, vol. 1 (16), pp. 2116-2127.

Li, H. et al., "Carbon nanodots: synthesis, properties and applications", Journal of Materials Chemistry, 2012, vol. 22 (46), pp. 24230-24253.

Liu, Q. et al. "Direct electochemistry of glucose oxidase and electrochemical biosensing of glucose on quantum dots/carbon nanotubes electrodes", Biosensors and Bioelectronics, 2007, vol. 22, pp. 3203-3209.

Qi, L et al, "Emerging application of quantum dots for drug delivery and therapy", Expert Opinion on Drug Delivery, 2008, vol. 5 (3), pp. 263-267.

Goncalves, H et al., "Fluorescent carbon dots capped with PEG200 and mercaptosuccinic acid", Journal of Fluorescence, 2010, vol. 20 (5), pp. 1023-1028.

Nie, H. et al., Carbon Dots with Continuously Tunable Full-Co9lor Emission and Their Application in Ratiometric pH Sensing, Chemistry of Materials, 2014, vol. 26, pp. 3104-3112.

Zhang, Y. et al., "One-pot synthesis of N-doped carbon dots with tunable luminescence properties", Journal of Materials Chemistry, 2012, vol. 22, pp. 16714-16718.

Guo, X et al., "Facile access to versatile fluorescent carbon dots towards light-emitting diodes", Chem. Commun., 2012, vol. 48, pp. 2692-2694.

\* cited by examiner

GREEN PRODUCTION OF HIGHLY FLUORESCENT CARBON QUANTUM DOTS FROM CARBON DIOXIDE

BACKGROUND

Quantum dot materials in general are made of semiconductor materials. Some semiconductor-based quantum material is made with cadmium and mercury sulfides and selenides, although possessing strong fluorescent emission properties, are high in toxicity because of the use of heavy metals in their production. Another downside to producing these kinds of quantum dots is their cost, due to the fact that the precursors used to make them can be expensive.

Carbon quantum dots ("CQD") are attracting interest due to their high fluorescent quantum yield and low cytotoxicity. Areas of interest for use of carbon quantum dot nanomaterials include chemical sensing, bio-sensing, bio-imaging, chemical sensing, nano-medicine, and photo-catalysis.

Although carbon quantum dots have been prepared in a variety of ways, most are top down synthesis that produce significant amounts of waste and require oxidative processing. In addition, current bottom up approaches have limited production capacity. Conventional means for producing CQD are electrochemical synthesis, laser ablation, arc discharge, microwave/ultrasonic synthesis and hydrothermal treatment. These methods of CQD production tend to be costly and yield a miniscule amount of product.

Magnesium metal is known to burn in carbon dioxide to produce carbon and magnesium oxide. It has been reported that few layer graphene forms from magnesium ribbon burned in a $CO_2$ atmosphere; however, this reaction is uncontrollable and reaches quite high temperatures.

It is also known the $CO_2$ is a by-product of various industrial activities such as ethanol production, distilleries, ammonia production or hydrogen reforming, not to mention the burning of fossil fuels. To that end, it is widely believed that human related $CO_2$ emissions contribute to greenhouse effects in the atmosphere. Accordingly a need exists for scalable methods for producing carbon quantum dots that uses inexpensive waste gases, such as $CO_2$, and does not require washing with cytotoxic reagents.

SUMMARY

The inventors of the subject invention have developed a method of preparing fluorescent material containing carbon quantum dots, wherein the method comprises milling a metal in the presence of carbon dioxide in a sealed container for a set duration to form the carbon quantum dots containing material. In an embodiment, the metal includes a metal wherein the enthalpy of formation of its metal oxide is higher than that of $CO_2$. In an embodiment, the metal is magnesium. The carbon dioxide is preferably obtained as a waste gas from a human related activity such as an industrial process and may be provided in the form of dry ice.

DETAILED DESCRIPTION OF THE INVENTION

Figure 1:
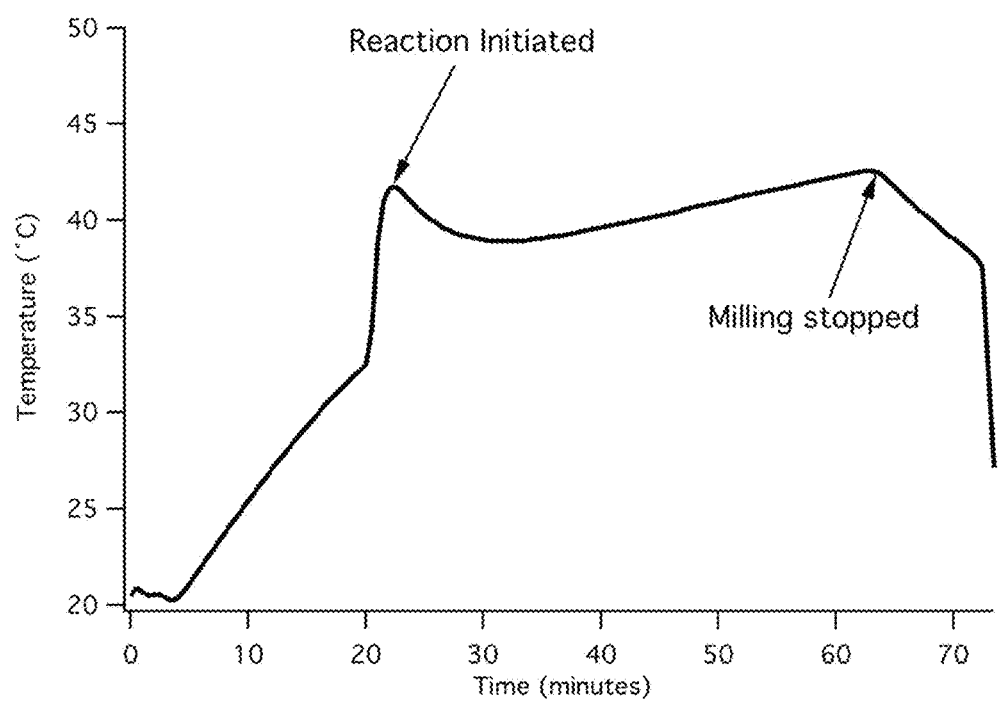
FIG. 1 is a graph showing the temperature rise of a milling vial during a mechanochemical production of carbon quantum dots according to Example 1 below.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the preceding definitions are provided. It is further noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item.

Embodiments of the invention comprise controlling the exothermic temperature of the reaction between a reactive metal and $CO_2$ by milling the metal in the presence of $CO_2$ in a sealed container for a set duration. The container is sealed to minimize the presence of oxygen that may react with the metal. The $CO_2$ is preferably a "waste gas", which is intended to mean a gas that is a by-product emission from some human related activities such as industrial processes. The $CO_2$ may take the form of dry ice and the metal and dry ice may be provided in equal parts. Alternatively, the $CO_2$ can be introduced into a pressurized milling vessel as a gas and the product is formed via reaction between the $CO_2$ gas and the reactive metal.

An example of a metal that may be used to form the quantum dot containing material is magnesium; however, the invention is not so limited. To that end, any metal wherein the Enthalpy of Formation of its oxide is higher than that of $CO_2$ (−393.5 kJ/mol) and where the by-product oxide is easily removed. Accordingly, the metal may include those Group 1 and 2 elements, lanthanides, actinides and zinc, for example.

EXAMPLE 1

In an example, 0.8000 grams of magnesium and 0.8000 grams of dry ice were placed in a 65 mL stainless steel SPEX Certiprep milling vial along with three 0.5" 440 C stainless steel ball bearings. The vial was sealed and milled for 1 hour in a SPEX 8000M mixer mill. An iButton temperature logger was attached to the outside of the vial to monitor reaction progress. FIG. 1 shows the temperature rise of the vial during milling. The peak around 20 minutes is due to the following reaction: $2Mg+CO_2>2MgO+C$.

Note that the rise in temperature is limited indicating very little time for particle growth. The reaction between the magnesium and $CO_2$ is essentially complete after this temperature spike at about 20 minutes indicating that the additional 40 minutes of milling was not needed.

Figure 2:
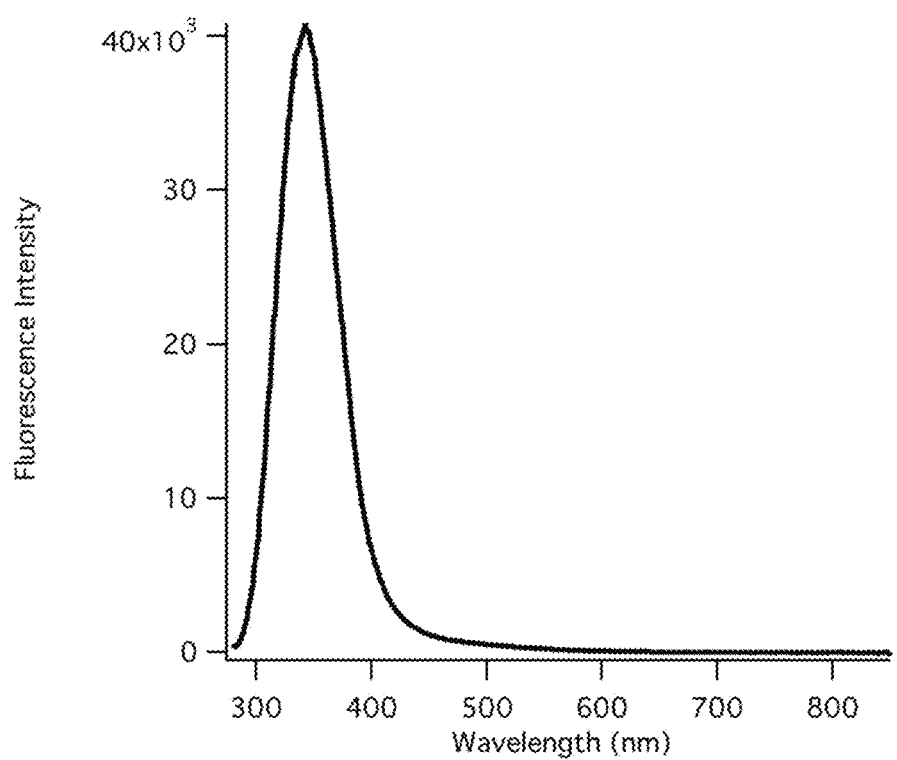
FIG. 2 is a graph showing narrow fluorescence produced from the solubilized carbon quantum dots of Example 1.

The material was removed from the vial and washed in weak (1 M HCl) acid to remove the MgO by-product. The material was then centrifuged and dried. The dry material was heated in PED1500N for 72 hours then suspended in water. More specifically, 10 mg of material was reacted with 100 mg of PED1500N for fluorescent testing. The "product" was a pale brown solution that was highly fluorescent. The fluorescence intensity of the material was tested using a microplate reader to take fluorescence spectra under 250 nm-550 nm. With respect to FIG. 2, a graph shows the fluorescence intensity peaking at about $40 \times 10^3$ at a wavelength of about 350 nm.

In this example, the inventors were able to make 0.218 grams of the material comprising carbon quantum dots in 20 minutes; however, the method is certainly scalable such that larger scales are readily achievable. By initiating combustion in a ball mill, the large thermal mass of the milling container limits the temperature rise of the reaction between the Mg and $CO_2$ and also the growth of carbon quantum dots. This allows very small (a few nanometers) quantum dots to be prepared readily. The relatively smaller quantum dots will have less of an immune response and should be more uniform in shape and size.

Moreover, due to the rapid nature of this reaction or process, dopants can be introduced to increase the intensity of the red fluorescence. This is desirable for medical imaging application. The dopants can be selected from elements in Groups 13, 14, 15, or 16. Heavy Group 16 elements can also be introduced in the form of their carbon compounds, such as $CS_2$, $CSe_2$, and $CTe_2$.

As indicated above, in a preferred embodiment the $CO_2$ used in the subject invention is a waste gas recovered from a human related activity such as an industrial process, wherein the waste gas is converted to dry ice. Alternatively, one skilled in the art will appreciate that the container may be configured such that compressed $CO_2$ gas may be directly injected into the container. In either instance, a sufficient amount of reactive metal should be provided so that all of the $CO_2$ is consumed.

In another example, Example 2, 25 grams of magnesium was weighed out and added into a stainless steel attrition mill reaction vessel followed by 6 lbs. of 6.35 mm stainless steel ball bearings. The reaction vessel was sealed from the atmospheric environment and the ambient air inside was purged out with $CO_2$. Then the vessel was filled with 60 psi of $CO_2$ and milled for two hours at a stirring speed of 700 rpm.

Once milling was completed, the product/material was collected and washed with deionized water. The material was acidified by adding 1M hydrochloric acid dropwise and stirring for 30 minutes. The solution was then vacuum filtered to collect the product, the carbon dots. After drying in an oven at 80° C. overnight, the product was then dialyzed to remove any impurities. The dialysis tubing was suspended in a container of deionized water for three days, replacing the water each day.

After the dialysis, the carbon dots were vacuum-filtered and dried in an oven at 80° C. The carbon dots were capped by adding 20 mg of amino-terminated polyethylene glycol (PEG) to 2 mg of carbon dots and heating it at 120° C. for 3 days. After the 3 days, deionized water was added to the carbon dots and the solution was centrifuged. The supernatant containing the carbon dots was collected and analyzed for luminescence emission using a Tecan Infinite M200 Pro at the excitation wavelengths of 250 nm, 300 nm, 350 nm, 400 nm, 450 nm, and 500 nm. The supernatant was also used to prep TEM (transmission emission microscopy) samples on a carbon mesh grid.

Figure 3:
FIG. 3 is a photograph of bulk carbon quantum dots after acidification and dialysis of the mechanochemical production of quantum carbon dots according to Example 2 below.

The reaction follows chemical equation 1, which includes magnesium oxide, MgO, as a product. The crude product is a black color, clearly indicating that the magnesium metal reacted with the CO2. Milling 30 g of magnesium under excess CO2 led to collecting over 39.2588 g of crude product. The amount collected was limited by some of the product getting stuck on the surfaces of the milling media. Once the crude product is suspended in water, it created a basic solution. After acidifying the suspension and isolating the remaining solid via vacuum filtration, 3.9316 g of a black material that contained the CQDs was collected. A photograph of the carbon quantum dot containing material is shown in FIG. 3. Assuming that this material collected was all carbon, the product yield would be 53.1%.

Figure 4A:
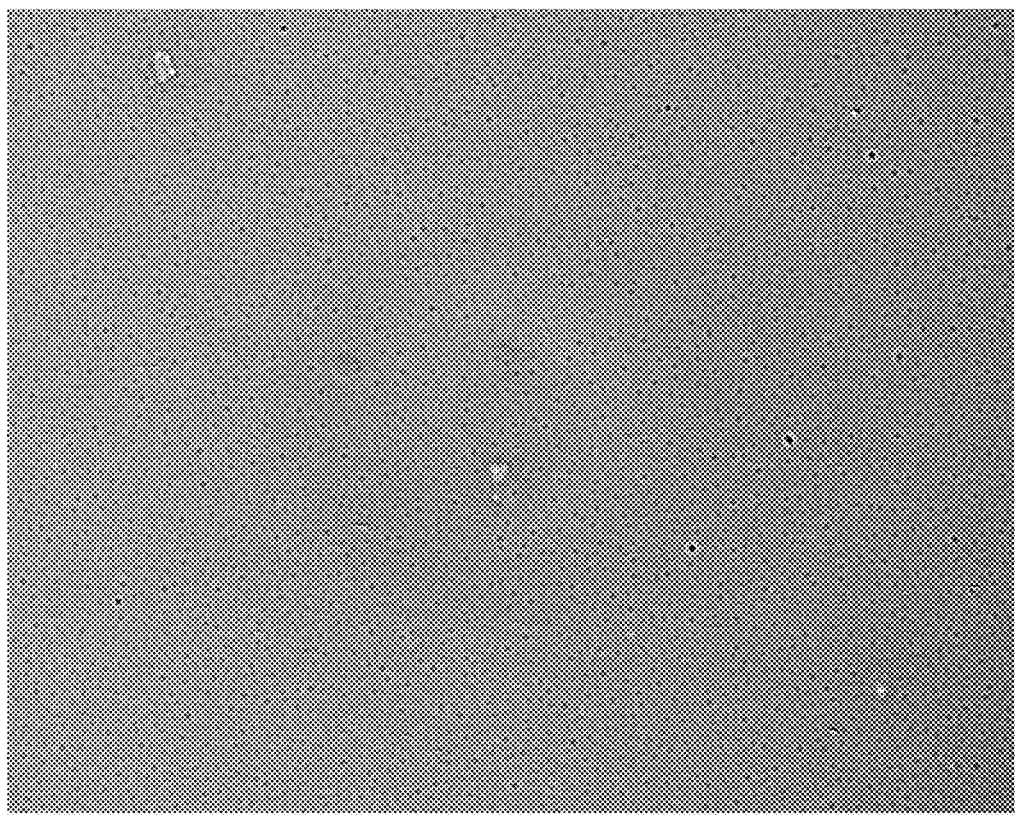
FIG. 4A is a transmission electron microscope (TEM) image of carbon dots produced according to Example 2 below magnified 3000 times.
Figure 4B:
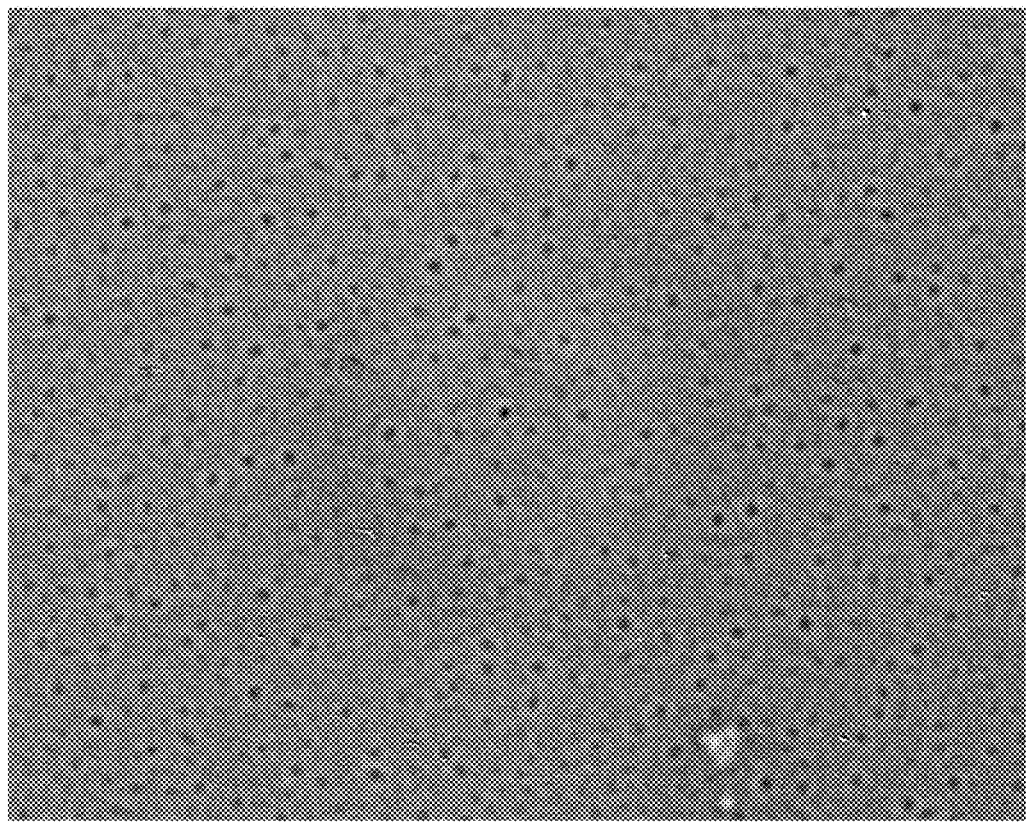
FIG. 4B is a TEM image of carbon dots produced according to Example 2 below magnified 6000 times.

A 3-day dialysis step is needed to rid of any impurities, so the yield is slightly smaller than the 3.9316 g. This method of producing CQDs is relatively cost-efficient, with respect to precursors, compared to the existing methods in literature. A reaction of 30 g of magnesium requires 27.16 g of CO2, which will cost about $0.06 and $0.04, respectively. So for $0.10 of starting material, the inventors were able to obtain roughly 4 g of CQDs. The TEM images of FIGS. 4A and 4B show CQDs in the size range of 25 nm to 60 nm.

Figure 5A:
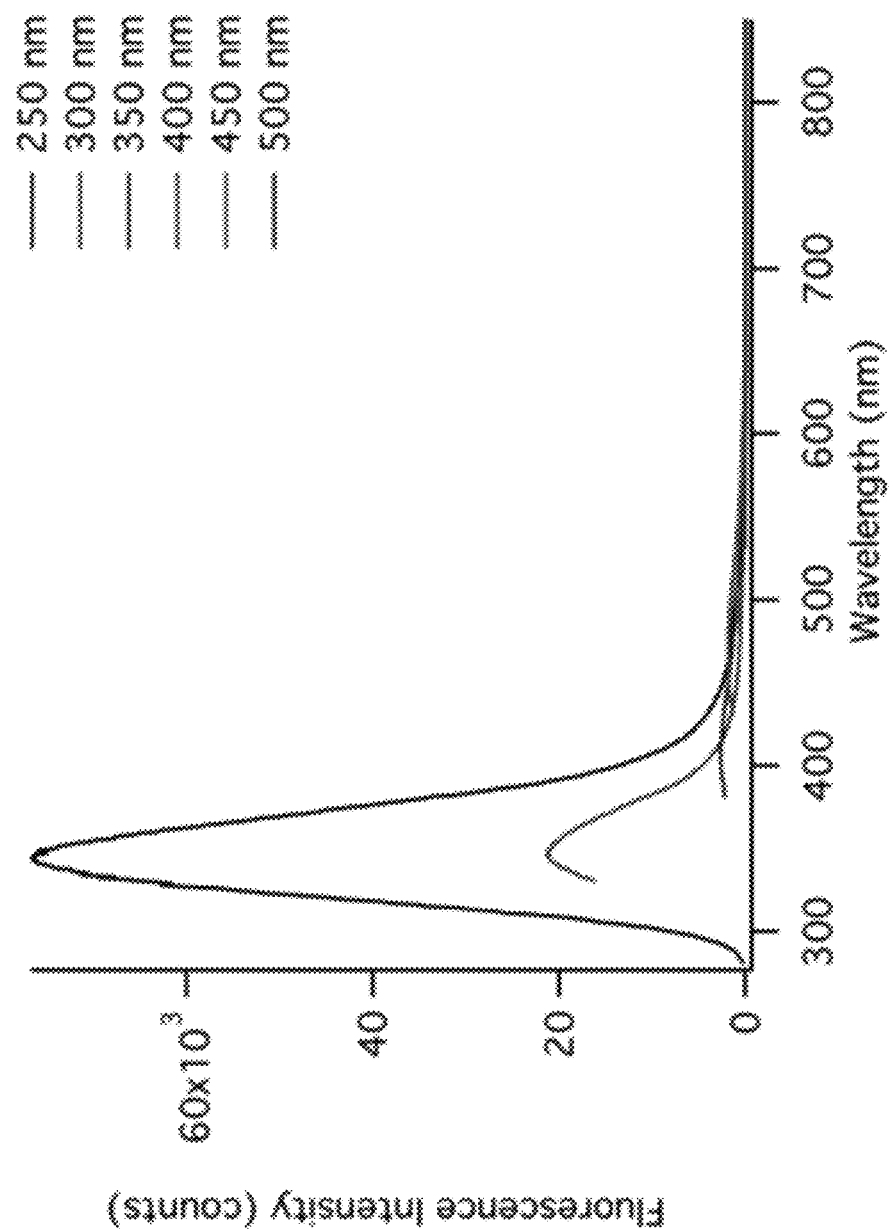
FIG. 5A is a graph showing fluorescence intensity data of the carbon quantum dots produced according to Example to below.
Figure 5B:
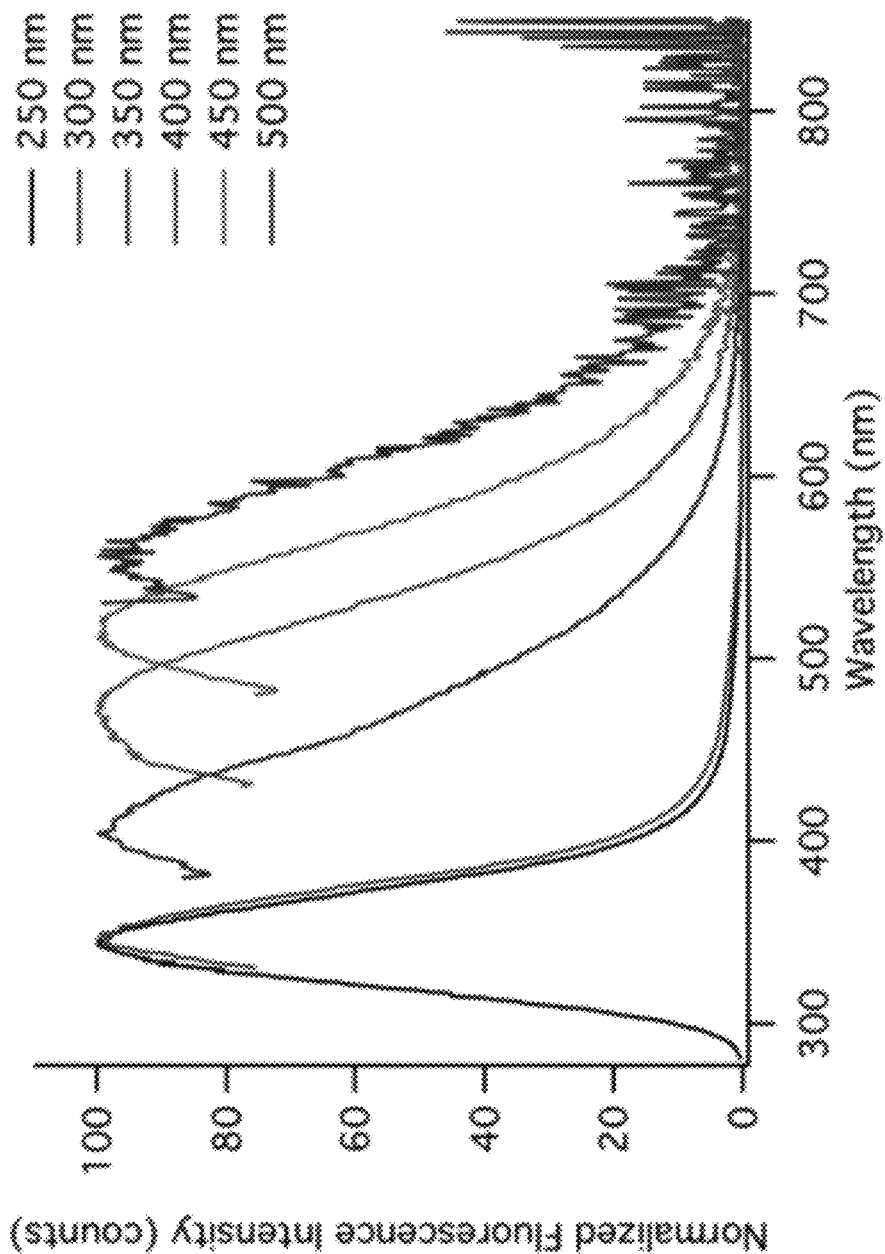
FIG. 5B is a graph showing the fluorescence intensity data of FIG. 5A, normalized.

In reference to FIGS. 5A and 5B, fluorescence emission data indicates that the inventors were able to obtain a high concentration of CQDs that absorbed and strongly emitted at the higher energy wavelengths. As the excitation wavelength was shifted towards higher wavelengths, the emission intensity decreased, indicating that the larger CQD particles are not as prevalent as the smaller-sized CQDs. The inventors were able to excite at 250 nm, at the lowest, but it is proposed that the lower the excitation wavelength is, the higher the corresponding emission intensity will be. Based on the normalized fluorescence data of FIG. 5B, there is a presence of different sized CQDs that emit from about 250 nm up to about 500 nm.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, any means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

The invention claimed is:

1. A method of preparing fluorescent material containing carbon quantum dots, comprising:

milling a metal in the presence of carbon dioxide in a sealed container for a set duration to form a carbon quantum dot containing material.

2. The method of claim 1 wherein the metal includes a metal wherein the enthalpy of formation of its metal oxide is higher than that of carbon dioxide.

3. The method of claim 2 wherein the metal is magnesium.

4. The method of claim 1 further comprises removing a metal oxide by-product from the material.

5. The method of claim 4 wherein the step of removing the metal oxide by-product from the material comprises washing the material with an acid.

6. The method of claim 5 wherein the weak acid is 1M HCl.

7. The method of claim of claim 5 further comprising drying the material.

8. The method of claim 1 wherein carbon dioxide is a waste gas obtained from an industrial process.

9. The method of claim 1 further comprising introducing a dopant containing an element selected from Group 13, 14, 15 or 16 or a combination thereof.

10. The method of claim 9 wherein introducing the dopant includes introducing a carbon compound form of the Group 16 element.

11. The method of claim 5 further comprising dialyzing the material.

* * * * *